May 2, 1961 G. I. ROBERTS 2,982,330
METHOD AND APPARATUS FOR FORMING STATOR END TURNS
Filed June 19, 1957 4 Sheets-Sheet 1
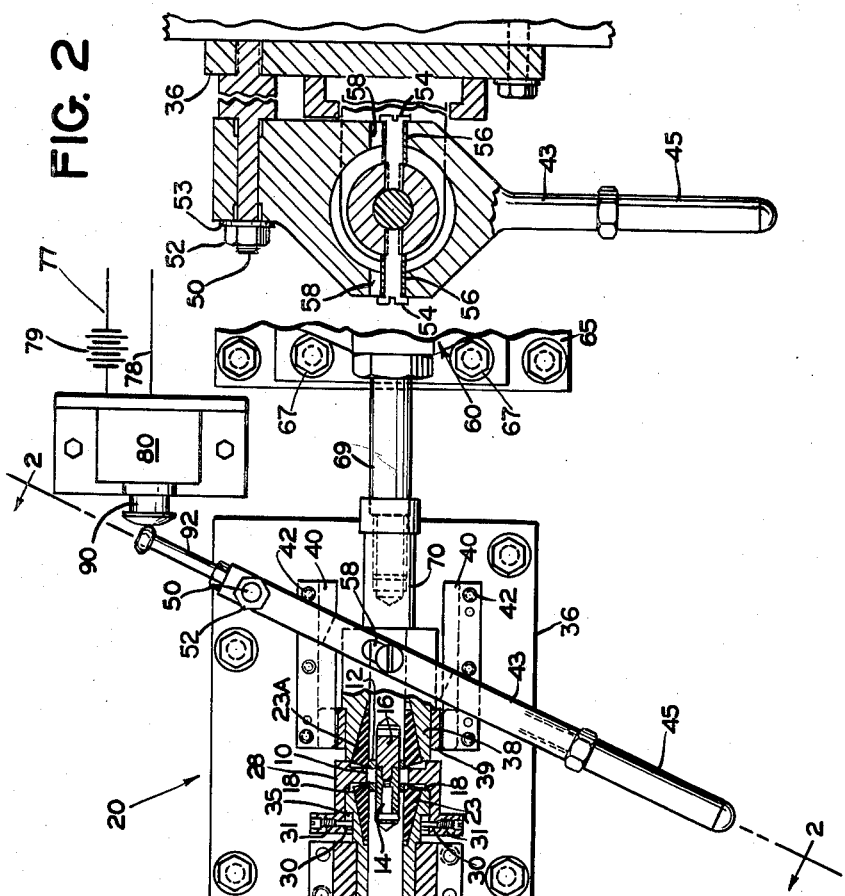
INVENTOR.
GEORGE I. ROBERTS
BY
ATTORNEY

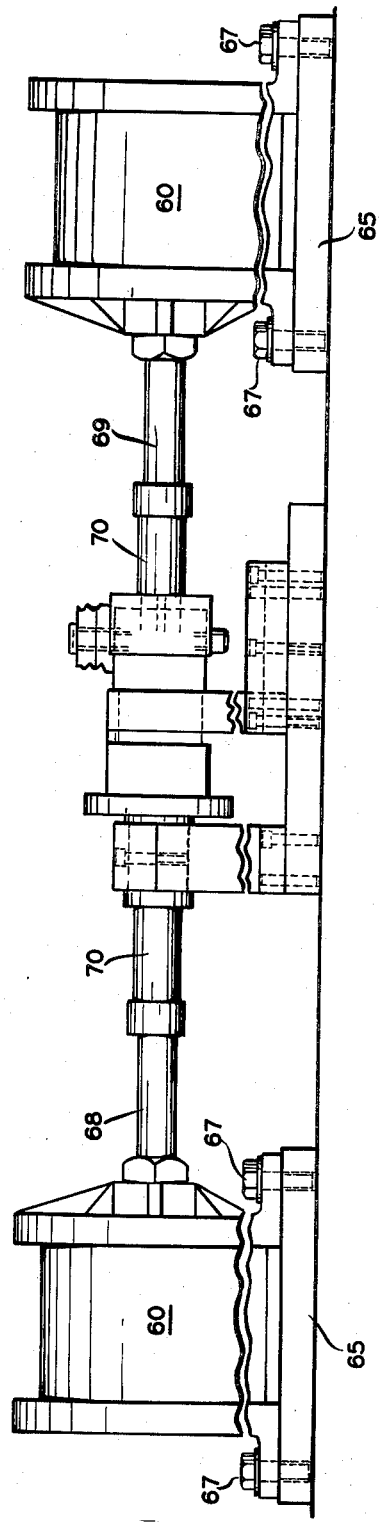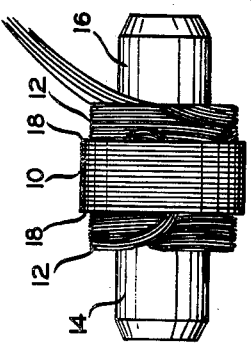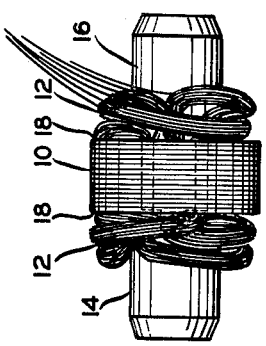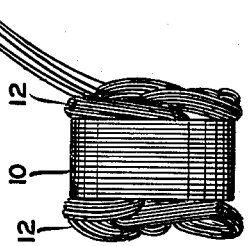
INVENTOR.
GEORGE I. ROBERTS
BY
ATTORNEY

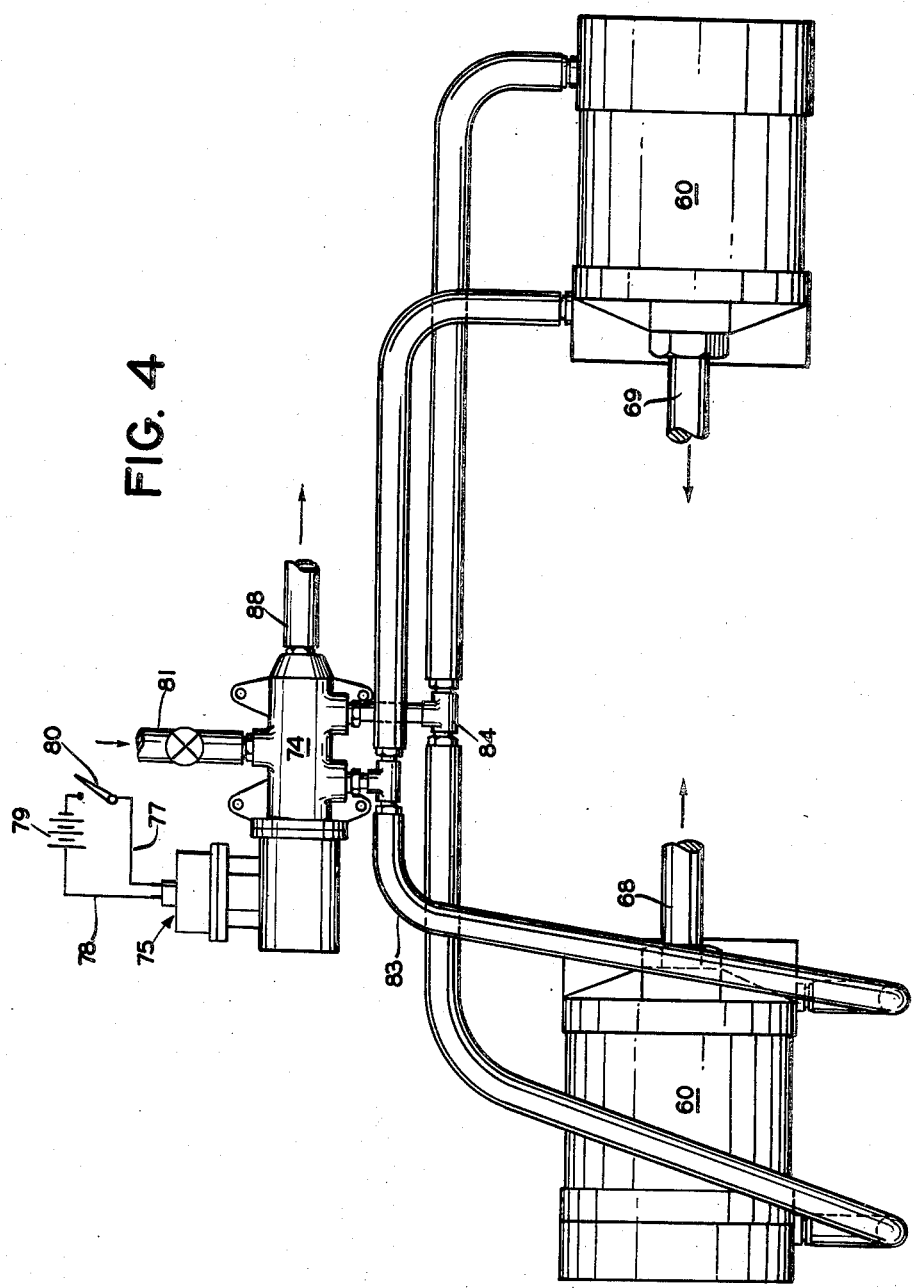

May 2, 1961  G. I. ROBERTS  2,982,330
METHOD AND APPARATUS FOR FORMING STATOR END TURNS
Filed June 19, 1957
4 Sheets-Sheet 4

INVENTOR.
GEORGE I. ROBERTS
BY
*Herbert L. Davis*
ATTORNEY

United States Patent Office 2,982,330
Patented May 2, 1961

2,982,330

METHOD AND APPARATUS FOR FORMING STATOR END TURNS

George I. Roberts, Maywood, N.J., assignor to The Bendix Corporation, a corporation of Delaware Filed June 19, 1957, Ser. No. 666,569

8 Claims. (Cl. 153—2)

The invention relates to a novel method and apparatus for forming end turns of a stator of a type wherein it is necessary to form the same to a specified dimension; that is, to form in the shape of a ring having specified dimensions with reference to inside and outside diameters plus thickness An object of the invention is to provide a novel method to facilitate end turn forming by a novel use of a standard "Jacobs" collet.

Another object of the invention is to provide a novel apparatus for compressing the coils about the ends of a stator.

Another object of the invention is to provide a novel means whereby the outside diameter of the end turns about a stator may be controlled by the squeeze on the collets; the inside diameter by suitable forming elements; and the thickness or height of the end turns by the position of suitable ram stops.

Another object of the invention is to provide a novel method and means for forming large mass of end turns.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

Figure 1 is a fragmentary sectional view of the stator end turning fixture.

Figure 2 is a sectional view of the operating arm for the end turning fixture taken along the lines 2—2 of Figure 1.

Figure 3 is a longitudinal side view of the stator end turning fixture.

Figure 4 is a view illustrating the air control valve and operative hook up for the air pistons of the end turning fixture.

Figure 5 illustrates a typical stator in an initially wound condition.

Figure 6 illustrates the stator after the forming elements have been inserted therein and the windings have been compressed about the same.

Figure 7 illustrates the stator after the windings thereon have been processed in the stator end turning fixture.

Figure 8:
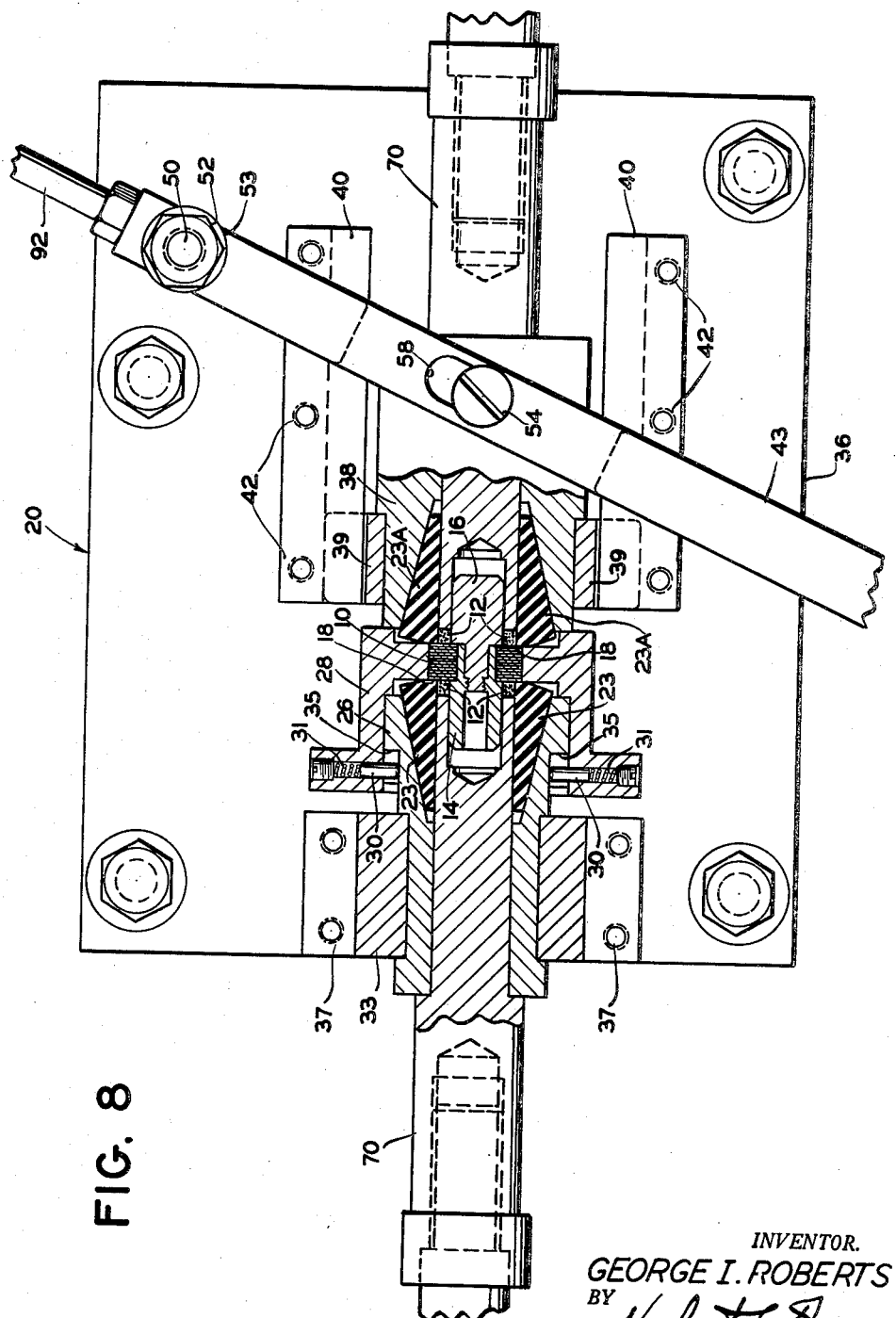
Figure 8 is an enlarged fragmentary sectional view showing the stator assembly of Figure 7 mounted in the assembly of Figure 1.

Referring to the drawing of Figure 5 a stator 10 of a conventional laminated magnetic core is initially wound, wedged and connected as shown in the drawing so as to provide wire end turn windings 12. Forming elements or studs 14 and 16 are then assembled as shown in Figure 6 and the end turns 12 of wire are formed to a diameter slightly less than the outside diameter of the stator 10 by means of hand pliers. The hand plier operation is desirable since it is necessary to provide a shoulder 18 upon which the stator 10 rests in the stator end turning fixture of Figure 1, as will be described hereinafter.

With reference to the end turning fixture 20 of Figures 1 and 8, there is indicated by the numeral 23 a "Jacobs" rubber collet preloaded in a stationary bearing or sleeve 26 by sleeve 28 carrying pins 30 loaded by spring elements 31. The position of the rubber collet 23, as shown in Figure 1, is the final forming position. The pins 30 of which there are four (4) engage the shoulder 35 of sleeve 26 in the preload position so that the sleeve 26 tends in such position to squeeze the collet 23 to a diameter sufficient to form a shoulder for the shoulder 18 of stator assembly 10 to rest against.

The squeeze of the collet 23 is accomplished by forcing the collet into and along an internal tapered surface within the sleeve 26 by means of sleeve 28. The sleeve 26 is mounted rigidly in the split bearing 33 which is attached to a base plate 36 by means of mounting screws 37. The collet 23 is used to form the outside diameter of end turns 12 on the left side of stator 10.

A second rubber collet 23A, shown on the reference drawing of Figures 1 and 8, is used to form the outside diameter of end turns on the right side of the stator 10. It is located in a movable sleeve 38 which is mounted rigidly in a sliding T-shaped bracket 39 which is guided by tracks 40 assembled to base 36 by means of screws 42.

As shown by Figures 1 and 2, a lever assembly consisting of lever 43 and handle 45 is pivoted on shoulder stud 50 mounted in base 36 and held in position by nut 52 and washer 53. The lever 43 is connected to sleeve 38 by means of two (2) shoulder screws 54 and two (2) sleeves 56 and is provided with two (2) slots 58 so that as lever 43 is rotated about its pivot stud 50, it will move sleeve 38 in a horizontal direction towards and away from the stator mounting sleeve 28.

On each side of the plate 36, there are located air cylinders 60 which are mounted on separate securing plates 65 by means of screws 67. Rigidly connected to pistons 68 and 69 of air cylinders 60 are two (2) rams 70. One end of each of these rams 70 is bored out for a slide fit over the elements 14 and 16 forming the inside diameter of the windings 12 while the outside diameter of the rams 70 is the same as the specified outside diameter of the end turn windings 12.

With reference to the drawing of Figure 4, there is indicated by the numeral 74 an air valve of conventional type controlled by a solenoid 75 operatively connected by electrical conductors 77 and 78 to a source of electrical energy 79 through a switch 80 shown diagrammatically in Figure 4 and structurally in Figure 1. The solenoid operated air valve 74 is connected to inlet line pressure by a conduit 81 while outlet pressure conduits 83 and 84 lead from the air valve 74 to the air cylinders 60 to effect operation of the pistons 68 and 69 in an outward sense upon energization of the solenoid 75 and operation of the pistons 68 and 69 in an opposite sense upon deenergization of the solenoid 75. A conduit 88 leads from the air valve 74 to exhaust fluid pressure medium from one side or the other of the pistons 68 and 69 in cooperation with the operative air pressure at the opposite side of the pistons as directed by the air valve 74 so as to effect the operation of the rams 70, as heretofore explained.

The switch 80, as shown in Figure 1, includes an operative element 90 actuated to a switch closing position by an arm portion 92 of the lever 43 upon movement thereof in a clockwise direction to the position shown so as to cause energization of the solenoid 75 and effect operation of the valve 74 in a sense to direct operative pressure through conduits 84 and exhaust pressure through conduits 83 and 88 so as to cause pistons 68 and 69 to move outward to effect the operation of the rams 70.

*Operation*

In the operation of the device of Figure 1 it will be seen that initially the lever 43 is so positioned as to allow sufficient space between the collet 23A and the stator mounting sleeve 28 to mount the stator assembly of Figure 6 in the sleeve 28 with the stator 10 having the shoulder 18 against the collet 23. Slots not shown are provided in collet 23A, sleeve 28 and sleeve 38 for connecting leads.

To squeeze the collets 23 and 23A and form end turns 12 to a specified outside diameter, the lever 43 is moved clockwise first moving the assembly comprising collet 23A, sleeve 38, and bracket 39 towards the stator mounting sleeve 28 until collet 23A envelopes end turns 12 and rests against sleeve 28. Further rotation of lever 43 in a clockwise direction will first squeeze collet 23A until the squeeze of the two (2) collets 23 and 23A is the same, then the sleeve 28 will be moved until it hits sleeve 26 at which time both collets 23 and 23A will be squeezed to specified dimension of outside diameter for stator end turns. When lever 43 is almost at the end of its stroke it closes switch 80 operating solenoid valve 74. Operation of the solenoid valve 74 allows air under pressure to enter the air cylinders 60 moving pistons 68 and 69 and rams 70 rapidly toward each other to compact the wire end turns 12 to a specified dimension, as shown in Figure 7. The rams 70, whether in the operative or inoperative position, are always in the bores of sleeves 26 and 38. In the operative position the stroke of the rams 70 are limited by sleeves 26 and 38.

In conclusion the outside diameter of the end turns 12 is controlled by the amount of squeeze on the collets 23 and 23A the inside diameter is controlled by the posts 14 and 16 and the thickness or height by a specified applied pressure on air cylinders 60.

While the lever 43 is shown as manually operative by the handle 45, a third air cylinder and air piston, not shown, could be used to effect the initial operation of the lever 43 or the assembly comprising collet 23A, sleeve 28 and bracket 39 in place of the manual operation, as described.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. An apparatus for comprising wire turns at opposite ends of a wire wound circular magnetic core; comprising a pair of flexible collets, first means for supporting the wire turns at opposite ends of the magnetic core within the flexible collets, second means for applying compressive forces to the outer surfaces of the flexible collets to squeeze the collets between the second means and the wire turns at the opposite ends of the core so as to cause the wire turns to be compressed by the forces applied to the flexible collets, and third means for applying additional axially directed forces to the wire turns at the opposite ends of the core and within the flexible collets to further compress the wire turns.

2. The combination defined by claim 1 in which the third means includes pressure pistons and rams operated thereby so as to be actuated toward each other to apply additional axially directed forces to the wire turns at the opposite ends of the core and within the flexible collets to further compress the wire turns.

3. The combination defined by claim 1 in which the supporting first means includes a forming element to limit the inner diameter of the compressed wire turns.

4. The combination defined by claim 1 in which the second means includes a manually operable means to initially apply said compressive forces to the outer surfaces of the flexible collets, and the third means includes power operated means and control means therefor effective upon movement of the manually operable means to a predetermined position to cause said power operated means to apply the additional axially directed forces to the wire turns at the opposite ends of the core and within the flexible collets so as to further compress the wire turns.

5. The combination defined by claim 1 in which the second means includes a manually operable means to initially apply said compressive forces to the outer surfaces of the flexible collets, the third means includes power operated means and control means therefore effective upon movement of the manually operable means to a predetermined position to cause said power operated means to apply the additional axially directed forces to the wire turns at the opposite ends of the core and within the flexible collets so as to further compress the wire turns, and in which the supporting first means includes a forming element to limit the inner diameter of the compressed wire turns.

6. In apparatus for compressing turns of wire at opposite ends of a wire wound core member; the combination comprising a pair of flexible sleeve members having external conical surfaces, a main sleeve member for carrying said core member, wire end turn forming stud elements projecting axially from opposite ends of the core member, a pair of auxiliary sleeve members positioned at opposite sides of said main sleeve member, each of said auxiliary sleeve members having an internal tapered surface for cooperating with the external conical surface of one of the flexible sleeve members to compress the flexible sleeve member inward, one of said auxiliary sleeve members being fixedly mounted and the main sleeve member and the other auxiliary sleeve member being movably mounted relative to said one auxiliary sleeve member, operable means to initially actuate said other auxiliary sleeve member and thereby said main sleeve member toward said one auxiliary sleeve member so as to cause said flexible sleeve members to be compressed about the end turns at opposite ends of the core member, a pair of power operated rams slidably mounted in said flexible sleeves and on said axially projecting stud elements so that upon the operation of said rams the wire end turns may be axially compressed between the rams at opposite sides of the core member and around the stud elements, and means for controlling the operation of said rams, said control means being actuated by said operable means in sequence after initial actuation of the other auxiliary sleeve member so as to effect said ram operation and compression of the wire end turns to a predetermined dimension on the core member and around the axially projecting stud elements and within the flexible sleeve member compressed about the wire end turns.

7. A method of forming wire turns at opposite ends of a previously wire wound circular magnetic core, comprising the steps of mounting the previously wound magnetic core on a forming element, positioning the wire turns at opposite ends of the magnetic core within flexible collets having inner and outer surfaces, applying compressive forces to the outer surfaces of the flexible collets at opposite ends of said core to cause the wire turns at the opposite ends of the core to be reshaped by the compressive forces acting on the flexible collets so as to squeeze the wire turns between the inner surfaces of the flexible collets and the forming element, and applying additional opposing compacting forces to the wire end turns at the opposite ends of the core so as to compress the wire turns axially on the core to a predetermined dimension within the flexible collets.

8. A method of forming wire turns at opposite ends of a previously wire wound circular magnetic core, comprising the steps of mounting and previously wound magnetic core on a forming element, positioning the wire turns at opposite ends of the magnetic core within flexible collets having inner and outer surfaces, applying compressive forces to the outer surfaces of the flexible collets for squeezing the flexible collets at opposite ends of said core to cause the wire turns to be reshaped by the squeezing forces directed inwardly against the outer surfaces of the flexible collets so as to squeeze the wire turns between the inner surfaces of the flexible collets and the forming element, and applying an additional axially directed force to the core and wire turns at the opposite ends of the core so as to compress the wire turns to a predetermined dimension on the core and within the flexible collets.

References Cited in the file of this patent

UNITED STATES PATENTS

| | | |
|---|---|---|
| 595,929 | Ward | Dec. 21, 1897 |
| 1,893,262 | Apple | Jan. 3, 1933 |
| 2,174,970 | Cornell | Oct. 3, 1939 |
| 2,228,930 | Robinson | Jan. 14, 1941 |
| 2,466,129 | Stoner | Apr. 5, 1949 |
| 2,558,823 | Crowley et al. | July 3, 1951 |

UNITED STATES PATENT OFFICE
CERTIFICATE OF CORRECTION

Patent No. 2,982,330                      May 2, 1961

George I. Roberts

It is hereby certified that error appears in the above numbered patent requiring correction and that the said Letters Patent should read as corrected below.

Column 3, line 53, for "comprising" read -- compressing --; column 5, line 2, for "and" read -- the --.

Signed and sealed this 3rd day of October 1961.

(SEAL)
Attest:

ERNEST W. SWIDER
Attesting Officer

DAVID L. LADD
Commissioner of Patents

USCOMM-DC